(12) United States Patent
Jackson

(10) Patent No.: US 9,937,541 B1
(45) Date of Patent: Apr. 10, 2018

(54) APPARATUS AND METHODS FOR PREVENTION OF MILL MARKS

(71) Applicant: William Jackson, McCalla, AL (US)

(72) Inventor: William Jackson, McCalla, AL (US)

( * ) Notice: Subject to any disclaimer, the term of this patent is extended or adjusted under 35 U.S.C. 154(b) by 166 days.

(21) Appl. No.: 14/921,670

(22) Filed: Oct. 23, 2015

Related U.S. Application Data

(60) Provisional application No. 62/080,930, filed on Nov. 17, 2014.

(51) Int. Cl.
| | | |
|---|---|---|
| *B21B 31/00* | (2006.01) | |
| *B32B 25/08* | (2006.01) | |
| *B32B 27/08* | (2006.01) | |
| *B32B 7/12* | (2006.01) | |
| *B32B 25/04* | (2006.01) | |
| *B21B 28/00* | (2006.01) | |

(52) U.S. Cl.
CPC ............ *B21B 31/00* (2013.01); *B21B 28/00* (2013.01); *B32B 7/12* (2013.01); *B32B 25/042* (2013.01); *B32B 25/08* (2013.01); *B32B 27/08* (2013.01); *B32B 2307/20* (2013.01); *B32B 2571/00* (2013.01)

(58) Field of Classification Search
CPC ... B21B 27/03; B21B 2203/32; Y10T 74/219; Y10T 74/2191; Y10T 74/2193
USPC ........ 428/692.1, 900; 492/1, 56, 8; 72/252.5
See application file for complete search history.

(56) References Cited

U.S. PATENT DOCUMENTS

| | | | | |
|---|---|---|---|---|
| 3,665,355 A | * | 5/1972 | Sasaki | H01F 7/0215 101/389.1 |
| 4,116,594 A | * | 9/1978 | Leanna | B41C 1/18 264/284 |
| 4,121,765 A | | 10/1978 | Fosteris | |
| 4,801,217 A | | 1/1989 | Goldberg | |
| 4,849,272 A | * | 7/1989 | Haney | B25H 5/00 280/770 |
| 5,503,891 A | | 4/1996 | Marshall et al. | |

(Continued)

FOREIGN PATENT DOCUMENTS

| | | |
|---|---|---|
| CN | 202656968 U | 1/2013 |
| EP | 1602890 A2 | 12/2005 |
| WO | 2007082991 A1 | 7/2007 |

*Primary Examiner* — Jason L Vaughan
(74) *Attorney, Agent, or Firm* — Bush Intellectual Property Law; Kenneth M. Bush

(57) ABSTRACT

A skin guard apparatus including a cover in the form of a flexible sheet that comprises a first layer and a complementary second layer bonded together. The first layer is formed of a compliant material sufficient to buffer an impact, and the second layer is formed of a magnetized material. The cover may be magnetically removably attachable upon a roller to protect the roller from mill marks. Related methods of use may include the step of attaching the cover upon a roller receivable in a mill stand. The cover may have the form of a flexible sheet that includes a first layer and a complementary second layer bonded together, with the first layer comprising a compliant material configured to buffer an impact in order to protect the roller from mill marks and the second layer comprising a magnetized material. Related methods of use may include the step of mounting a second roller in the mill stand while the cover is magnetically removably received upon the first roller.

9 Claims, 3 Drawing Sheets

(56) References Cited

U.S. PATENT DOCUMENTS

| | | | |
|---|---|---|---|
| 6,387,485 B1* | 5/2002 | Bielek | B43L 1/008 428/208 |
| 6,394,362 B1 | 5/2002 | Kramr | |
| 7,125,595 B2 | 10/2006 | Kobayashi | |
| 7,180,016 B2 | 2/2007 | Gebert | |
| 7,851,038 B2* | 12/2010 | Lohmeier | B32B 15/08 141/331 |
| 8,668,973 B2* | 3/2014 | Lohmeier | B32B 15/08 141/331 |
| 2003/0138620 A1* | 7/2003 | Fonseca | B32B 7/12 428/317.1 |
| 2014/0377736 A1 | 12/2014 | Essen et al. | |

* cited by examiner

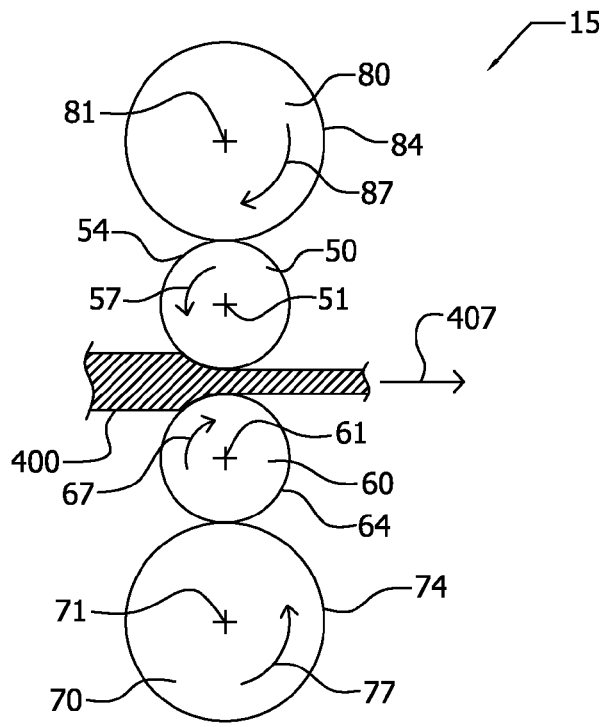
PRIOR ART  FIG. 1
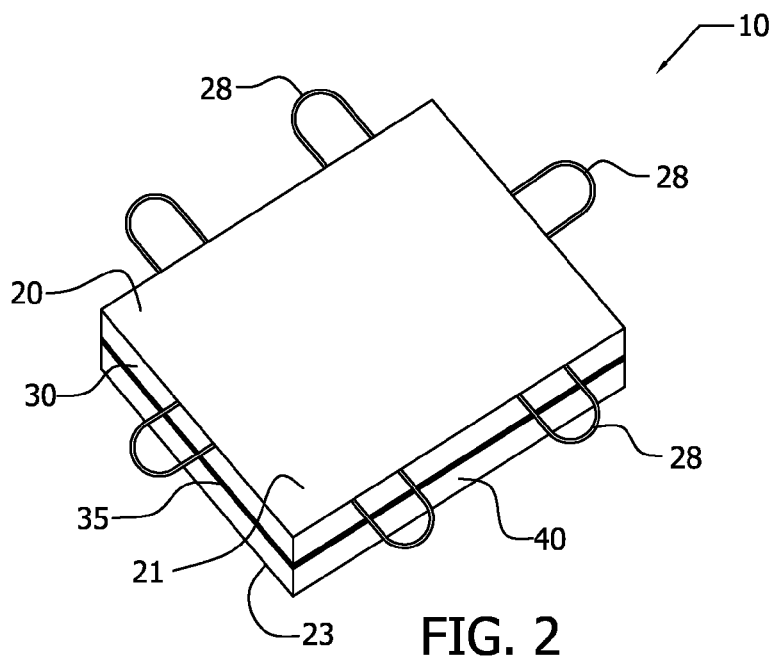
FIG. 2

APPARATUS AND METHODS FOR PREVENTION OF MILL MARKS

CROSS-REFERENCE TO RELATED APPLICATIONS

The present application claims priority and benefits of U.S. Provisional Patent Application No. 62/080,930 filed on Nov. 17, 2014, which is hereby incorporated by reference in its entirety herein.

FIELD OF THE INVENTION

The present disclosure generally relates to rolling mills, and, more particularly, to apparatus and related methods for the protection of rollers during mounting in a mill stand.

BACKGROUND OF THE INVENTION

Rolling is a metalworking process in which a material is passed through one or more pairs of working rollers in order to decrease the thickness of the slab and/or metal strip. The temperature of the material determines whether the rolling process is characterized as hot rolling versus cold rolling. Both hot rolling and cold rolling processes are commonly used.

Mill stands for rolling may be arranged in a number of configurations. For example, a four-high mill stand has four rollers, two smaller working rollers and two larger back up rollers. The material is pressingly engaged between the two working rollers as the two larger backup rollers engage the working rollers to stabilize the working rollers, which may facilitate greater accuracy of, for example, the gauge, width, or finish of the resulting rolled material.

It is imperative that the surfaces of the working rollers are free of mill marks because the surfaces of the working rollers are in direct contact with the material being rolled. Mill mark, as used herein, means an imperfection in the surface of the roller such as, for example, a dent, scratch, ding, or bruise skinning means creating a mill mark in the surface of the roller, and a skinned roller has a mill mark in the surface, as used herein.

A skinned working roller may imprint the mill mark into the resulting rolled material. Thus, when a working roller becomes skinned, the skinned working roller is removed from the mill stand and replaced with an unskinned working roller that is free of mill marks. The downtime required to replace a skinned working roller may range from about 15 minutes to about 20 minutes, which adversely affects productivity, efficiency, and profit margins. A grinding process that eliminates mill marks may be used in refurbishing the skinned working roller into an unskinned working roller. Refurbishing may cost from about US $7,000 to about US $10,000 per working roller.

An unskinned working roller may be skinned during replacement, which may lead to additional costs and down time. For example, in order to replace a set of working rollers in a four high mill stand, an overhead crane is engaged with the upper working roller. The crane lifts the upper working roller from the mill stand and onto a used roller rack. The crane then lifts the lower working roller from the mill stand and onto the used roller rack.

Once the skinned working rollers are removed from the mill stand, replacement working rollers free from mill marks may be mounted to the mill stand using the crane. For example, first an unskinned lower working roller is mounted to corresponding spindles of the mill stand. Then, an elongated rigid barrier, such as a wooden board, is placed atop the lower working roller to protect the lower working roller from being skinned. Finally, the upper working roller is mounted to a corresponding spindle of the mill stand.

The rigid barrier is supposed to prevent the working rollers from touching one another during mounting of the upper working roller onto the mill stand, as such touching may result in skinning of the working rollers. However, the working rollers may be greased with oil, thus making frictional engagement between the rigid barrier and the top of the lower working roller difficult during mounting of the upper working roller onto the mill stand. The rounded surface of the lower working roller may make the placement of the rigid barrier atop the lower working roller unstable. Vibrations caused by the crane during mounting of the upper working roller may dislodge the rigid barrier thereby rendering the rigid barrier non-functional. The rigid barrier may be dislodged during mounting of the upper working roller, for example, through contact with equipment or personnel or in other ways. When dislodged, the rigid barrier may no longer function, for example, to prevent touching between the working rollers that may result in the formation of mill marks.

It is also a present practice to put a second elongated rigid barrier atop the upper working roller following mounting of the upper working roller to prevent accidental touching between the upper working roller and the back up roller that may result in mill marks. Again, such use of the second elongated rigid barrier is unsatisfactory, suffering from deficiencies similar to the above described deficiencies of the rigid barrier in conjunction with the lower working roller. The rigid barrier(s) may suffer from deficiencies other than those described, as well.

Accordingly, there is a need for improved apparatus as well as related methods of use that prevents skinning of rollers during the mounting of rollers to a mill stand.

BRIEF SUMMARY OF THE INVENTION

These and other needs and disadvantages may be overcome by the apparatus and related methods of use disclosed herein. Additional improvements and advantages may be recognized by those of ordinary skill in the art upon study of the present disclosure.

A skin guard apparatus is disclosed herein. In various aspects, the skin guard apparatus includes a cover in the form of a flexible sheet that comprises a first layer and a complementary second layer bonded together by a bond. The first layer is formed of a compliant material sufficient to buffer an impact, and the complementary second layer is formed of a magnetized material, in various aspects. The cover may be magnetically removably attachable upon a roller to protect the roller from mill marks.

Related methods of use disclosed herein may include the step of attaching the cover upon a roller receivable in a mill stand. The cover may have the form of a flexible sheet that includes a first layer and a complementary second layer bonded to one another, with the first layer comprising a compliant material configured to buffer an impact in order to protect the roller from mill marks and the complementary second layer comprising a magnetized material. The related methods of use may include the step of mounting a second roller component in the mill stand while the cover is magnetically removably received upon the roller.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

BRIEF DESCRIPTION OF THE DRAWINGS

FIG. 1 illustrates by side view portions of an exemplary implementation of a prior art mill stand;

FIG. 2 illustrates by perspective view an exemplary implementation of a skin guard apparatus of the present invention;

Figure 3:
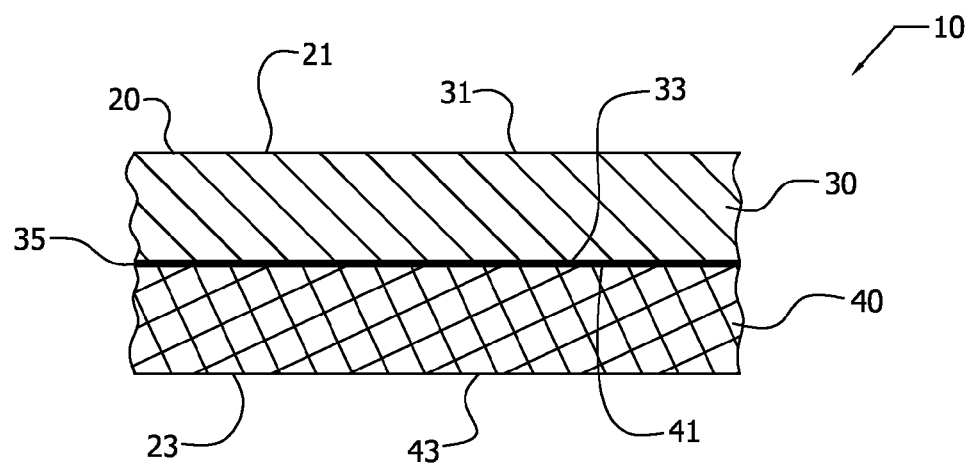
FIG. 3 illustrates by side cut-away view portions of the exemplary implementation of the skin guard apparatus of FIG. 2.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

A skin guard apparatus is disclosed herein along with related methods of use of the skin guard apparatus. In various aspects, the skin guard apparatus may include a cover in the form of a flexible sheet. The cover may include multiple layers of material bonded to one another, for example, a layer composed of a compliant material that buffers impacts upon the cover, and a layer composed of a magnetized material that attaches the cover to the roller by magnetic forces. The skin guard apparatus may include a roller that is a component of a mill stand, in various aspects, and the roller may be configured, for example, as a working roller or as a backup roller. Roller, as used herein, may refer to a working roller, backup roller, or other such roller associated with a mill stand.

When deployed, the cover may be attached about the roller, and the cover may be attached to the roller by magnetic engagement of the magnetized material layer of the cover with the roller. The layer composed of the compliant material may protect a surface of the roller against the formation of a mill mark in the surface by absorbing various impacts aimed toward the surface of the roller when the cover is deployed about the roller. Impacts may include, for example, impacts from another roller, impacts from tools, impacts from equipment, or impacts from falling objects. Such impacts may occur, for example, during mounting of roller(s). Mounting, as used herein, may include mounting of roller(s) to the mill stand, dismounting of roller(s) from the mill stand, as well as other maintenance operations involving the roller(s) or in associations with the roller(s).

FIG. 1 illustrates portions of an exemplary mill stand 15 that has a four-high configuration. The four-high configuration is selected for exemplary purposes, so that it should be understood that the skin-guard apparatus 10, 100 (see FIGS. 2, 6) disclosed herein includes other mill stands having other configurations. As illustrated in FIG. 1, mill stand 15 includes working rollers 50, 60 and backup rollers 70, 80 in a stacked arrangement. Working rollers 50, 60 rotate about axes 51, 61 as indicated in FIG. 1 by arrows 57, 67, respectively. Material 400 is compressed between surfaces 54, 64, respectively, of working rollers 50, 60 as material 400 is extruded in the direction indicated by arrow 407 by the rotations of working rollers 50, 60, as illustrated in FIG. 1.

Backup rollers 70, 80 rotate about axes 71, 81, respectively, as indicated by arrows 77, 87 in FIG. 1. In this implementation, as backup rollers 70, 80 rotate about axes 71, 81, respectively, surfaces 74, 84 engage surfaces 64, 54 of working rollers 60, 50 to provide forces to working rollers 60, 50, for example, to compress material 400 or to stabilize working rollers 60, 50. Note that backup rollers 70, 80 are of a larger diameter than working rollers 50, 60, in this implementation.

Working rollers 50, 60 and backup rollers 70, 80 may be composed of steel, which is a magnetic material. Material 400, which is being rolled in mill stand 15 as illustrated, may be, for example, any of various ferrous metals or other metals or materials, as would be readily recognized by those of ordinary skill in the art upon study of this disclosure.

FIG. 2 illustrates cover 20 of skin-guard apparatus 10. Cover 20 may be employed, for example, to protect surfaces 54, 64 of working rollers 50, 60, respectively, during change-out of working rollers 50, 60. Cover 20, as illustrated in FIG. 2, has a generally rectangular shape with sides 21, 23, but cover 20 may have other geometric shapes, in various other implementations. Cover 20 may be planar, in some implementations. In other implementations, cover 20 may have a curvature that generally conforms to the curvature of a roller, such as working roller 50, 60, or backup roller 70, 80 with which cover 20 may be engaged when deployed.

As illustrated in FIG. 2, cover 20 includes layer 30 and layer 40 bonded to one another by bond 35, and cover 20 is generally flexible to allow cover 20 to be wrapped about, for example, at least portions of working rollers 50, 60. Layer 30 of cover 20 may composed of a flexible impact absorbing material, and layer 40 of cover 20 may be composed of a flexible magnetic material. Layer 40 is a complementary layer to layer 30 in that layer 40 is preferably of the same shape as layer 30 so that layers 30, 40 coincide with one another when bonded together by bond 35.

A number of handles 28 are disposed about the periphery of cover 20 to facilitate manipulation of cover 20, as illustrated in the exemplary implementation of FIG. 2. Various numbers of handle(s), such as handle 28, may be included in various implementations of a cover, such as cover 20, and the handle(s) may be attached at various location(s) about the periphery of cover 20. Handle(s) 28 may be constructed in various ways, handle(s) 28 may be secured about the periphery of cover 20 in various ways, and cover 20 may be reinforced including proximate handle(s) 28, as would be readily recognized by those of ordinary skill in the art upon study of this disclosure. Handle(s) 28 may include reinforced cut-out sections disposed about the periphery of cover 20. The cut-out sections may include reinforcing about the cut-out sections to prevent tearing of the cover 20. Some implementations of the cover may omit the handle(s) 28.

FIG. 3 further describes exemplary cover 20. As illustrated in FIG. 3, side 33 of layer 30 is joined to side 41 of layer 40 by bond 35. Side 31 of layer 30 forms side 21 of cover 20, and side 43 of layer 40 forms side 23 of cover 20, as illustrated.

Layer 30 may be composed, at least in part, of a compliant material that absorbs energy from an impact. Layer 30 may be composed of, for example, a foam-like or rubberous material such as rubber, polychloroprene (e.g. Neoprene®), polystyrene (e.g. Styrofoam®), vinyl, polyethylene, cellulose based materials, poly-aramids (e.g. Kevlar®), meta-aramids (e.g. Nomex®), and other compliant polymeric materials that absorb an impact. Layer 30 thus functions to absorb impacts in order to prevent the formation of mill marks.

Layer 40 may be composed of a flexible magnetic material to allow magnetic attachment of layer 40 of cover 20 to a surface of a roller, such as surface 54, 64, 74, 84 of working roller 50, 60 or backup roller 70, 80, respectively. The flexible magnetic material that comprises layer 40 may be, for example, a ferrite-rubber mixture formed by the mixing of ferrite powder and rubber polymer and subsequent magnetization. The rubber may be either natural or synthetic, in various implementations. In various implementations, layer 40 may include the magnetic material in lamination with other material(s) such as vinyl. In various implementations, layer 40 may include mixtures of magnetic material with other material(s). In various implementations, layer 40 may be composed of Plastiform Flexmag™ available from Arnold Magnetic Technologies of Rochester, N.Y.

To form bond 35, for example, adhesive may be coated onto side 33 of layer 30, onto side 41 of layer 40, or onto both sides 33, 41. Following coating with the adhesive, sides 33, 41 may be mated to one another, and then the conjoined layers 30, 40 may be passed through rolling presses to remove any air that may be trapped between sides 33, 41. Then, the adhesive is allowed to cure thereby forming bond 35 that secures layer 30 to layer 40. Cover 20 is, thus, of a unitary construction with layer 30 bonded to layer 40 by bond 35. Other implementations may employ, for example, solvent welding or sonic welding to secure layer 30 to layer 40 thereby forming cover 20. In such implementations, bond 35 may be considered as the attachment points between layers 30, 40.

The thickness of layers 30, 40 may be selected to give a desired strength and ability to resist impacts to cover 20 while allowing cover 20 to be consolidated for transport or storage. The thickness of layers 30, 40 should not impede layer 40 from magnetically engaging working roller 50, 60 when cover 20 is deployed. Layer 30 may be of sufficient thickness to absorb impacts in order to prevent skinning of rollers, such as skinning of surfaces 54, 64 of working rollers 50, 60, or the skinning of surfaces 74, 84 of backup rollers 70, 80, when cover 20 is deployed. A disposable implementation of cover 20 made from less expensive materials and manufacturing processes is also envisioned. This disposable implementation may be reused at the discretion of the user.

In one exemplary implementation of cover 20, layer 30 is approximately 0.25 inch thick and composed of neoprene (polychloropreneor) adhesively joined to an approximately 0.125 inch thick layer 40.

Figure 6:
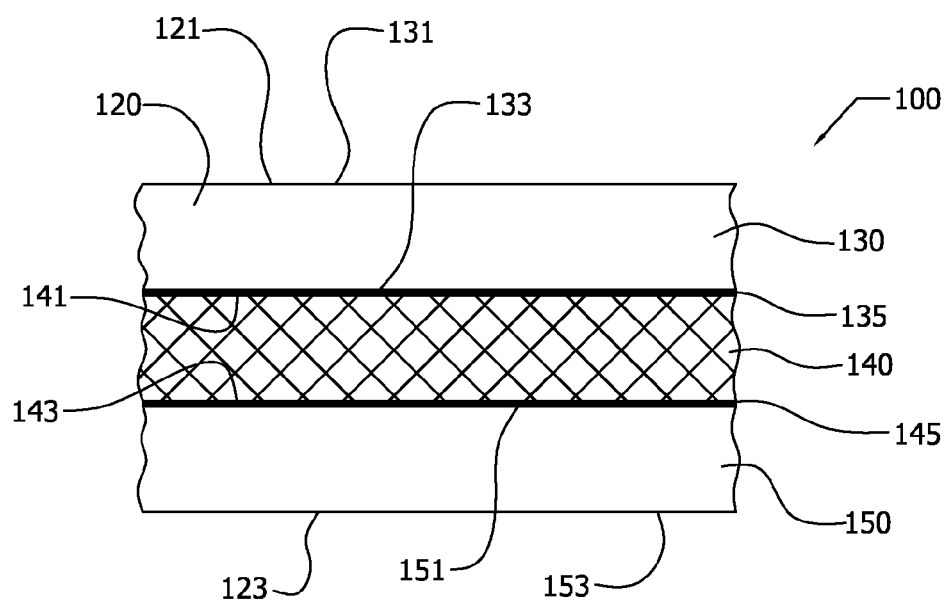

Other implementations of a cover, such as cover 120 illustrated in FIG. 6, may include additional layers. For example, as illustrated in FIG. 6, cover 120 of exemplary skin-guard apparatus 100 includes layers 130, 140, 150 with layer 140 interposed between layer 130 and layer 150. Side 131 of layer 130 forms side 121 of cover 120, and side 153 of layer 150 forms side 123 of cover 120, in the FIG. 6 exemplary implementation. Side 133 of layer 130 is bonded to side 141 of layer 140 by bond 135, and side 151 of layer 150 is bonded to side 143 of layer 140 by bond 145, as illustrated. Layer 130 of cover 120 may be composed of a material similar to the material of layer 30 of cover 20, and layer 140 may be composed of a material similar to the material of layer 40 of cover 20. Bonds 135, 145 of cover 120 may be composed of similar materials as bond 35 of cover 20. Bonds 135, 145 may be formed in ways similar to the formation of bond 35 of cover 20, or bonds 135, 145 may be both composed of similar materials and formed in similar ways as bond 35 of cover 20. Layer 150 may be included in cover 120 to protect layer 140 of cover 120. Layer 150 may be composed of, for example, poly-aramid, meta-aramid, or other materials similar to those materials used for layer 30 of skin guard apparatus 10.

Side 153 of material 150, which is side 123 of cover 120, may be received against the surface of a roller, such as surface 54, 64, 74, 84 of corresponding working roller 50, 60 or backup roller 70, 80, and magnetized layer 140 may engage cover 120 against the surface of the roller.

Figure 4:
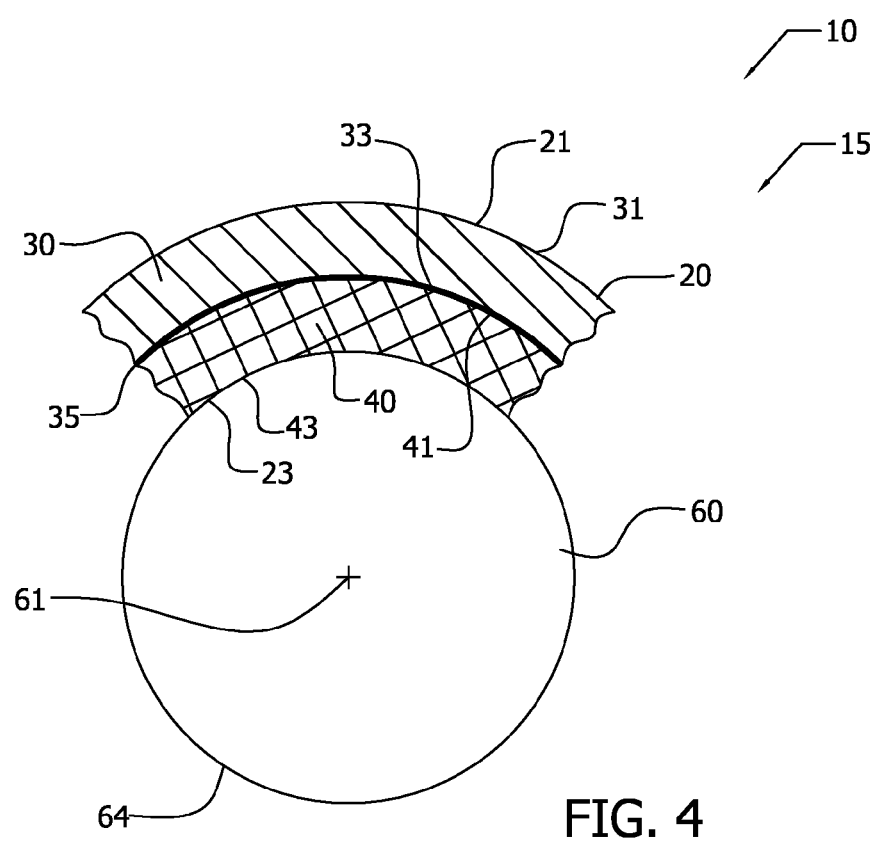
FIG. 4 illustrates by side cut-away view portions of the exemplary implementation of the skin guard apparatus of FIG. 2.

FIG. 4 illustrates cover 20 deployed about working roller 60 to protect surface 64 of working roller 60 from skinning. As illustrated in FIG. 4, side 23 of cover 20, which is side 43 of layer 40, is engaged magnetically with surface 64 of working roller 60 to attach removably cover 20 to working roller 60. Side 21 of cover 20, which is side 31 of layer 30, is faced away from surface 64 of working roller 60, as illustrated. During various deployments, cover 20 may be removably magnetically attached, for example, to any of working rollers 50, 60 or backup rollers 70, 80 to prevent skinning of surface(s) 54, 64, 74, 84.

Figure 5:
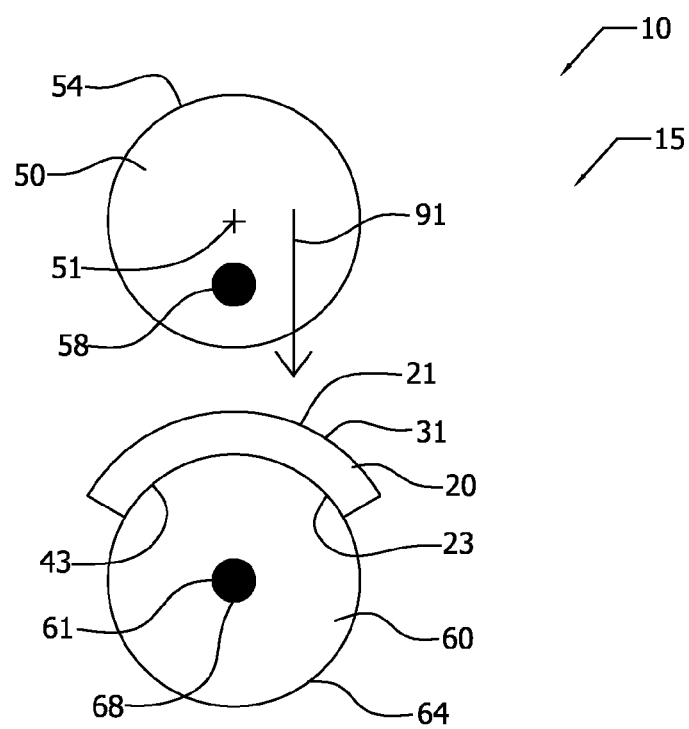
FIG. 5 illustrates by side view an exemplary deployment of the exemplary implementation of the skin guard apparatus of FIG. 2; and, FIG. 6 illustrates by side cut-away view portions of an exemplary implementation of a skin guard apparatus.

FIG. 5 illustrates skin guard apparatus 10 used with roller mounting. In the operation of skin guard apparatus 10, as illustrated in FIG. 5, axis 61 of working roller 60 is mounted to spindle 68 of mill stand 15, and cover 20 is then deployed over surface 64 of working roller 60 by magnetic engagement of side 43 of layer 40 with surface 64. Cover 20 may be deployed over surface 64 of working roller 60 by placing cover 20 in a rolled up state atop working roller 60. As cover 20 is unrolled, layer 40 magnetically engages securely surface 64 of working roller 60 to removably attach cover 20 to surface 64 of working roller 60.

With working roller 60 mounted to spindle 68 and cover 20 deployed about working roller 60, working roller 50 is then positioned to mount to spindle 58 of mill stand 15, as indicated by arrow 91 in FIG. 5. Cover 20 prevents the formation of mill marks in working rollers 50, 60 caused by contact between working rollers 50, 60 during mounting of working roller 50. Cover 20 may be sufficiently attached to surface 64 of working roller 60 by magnetic engagement of layer 40 with working roller 60 to prevent dislodgement of cover 20 from working roller 60, for example, by vibrations or movements induced in mill stand 15 or by contacts with workers or equipment during mounting of working roller 50.

Working rollers 50, 60 may be moved about for mounting with spindles 58, 68, respectively, of mill stand 15 using, for example, an overhead crane (not shown). Note that various structures and components of mill stand 15 are omitted from FIG. 5 for clarity of explanation.

The cover 20 may prevent surfaces 54, 64 of working rollers 50, 60 from touching one another during mounting of working rollers 50, 60 in order to prevent skinning of surfaces 54, 64. Layer 30 of cover 20 may absorb impacts between working rollers 50, 60 during mounting in order to prevent skinning of surface 54 or surface 64. Cover 20 may protect surface 64 from being skinned, for example, by impacts from tools, cables, chains, falling objects during the mounting of rollers 50, 60. Layer 30 by virtue of its compliant properties or thickness may absorb such impacts to prevent skinning of surface 64. Layer 30 buffers surface 64 from impacts.

Once the working rollers 50, 60 are mounted to the mill stand 15, cover 20 may be removed from engagement with surface 64 of working roller 60. Cover 20 may be manually removed using handle(s) 28. Following removal from working roller 60, cover 20 may be consolidated by being folded up or coiled for subsequent transport or storage.

Cover 20 may be deployed, for example, about any of working rollers 50, 60 or backup rollers 70, 80 in various operations to prevent skinning of any of working rollers 50, 60 or backup rollers 70, 80. Cover 20 may be deployed about other rollers in other mill stand configurations in order to prevent skinning, in various other implementations.

Cover 120 of skin guard apparatus 100 may be substituted for cover 20 of skin guard apparatus 10, in various operations. When cover 120 is substituted for cover 20, side 123 of cover 120, may be received against the surface of a roller, such as surface 54, 64, 74, 84 of corresponding working roller 50, 60 or backup roller 70, 80, and magnetized layer 140 may engage cover 120 against the surface of the roller. Cover 120 is configured to afford protection to the surface of the roller against the formation of mill marks, in various implementations. Cover 120 may be generally flexible in order to allow cover 120 to be consolidated when not in use.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A skin guard apparatus, comprising:
   a) a cover in the form of a flexible sheet, the cover comprising a first layer and a complementary second layer bonded to one another, the first layer comprising a compliant material configured to buffer an impact, and the complementary second layer comprising a magnetized material; and
   b) a roller attached to a mill stand, the roller having a smooth metal surface without mill marks, the cover magnetically removably received upon the surface of the roller to protect the surface of the roller from mill marks.

2. The skin guard apparatus of claim 1, the roller configured as a working roller.

3. The skin guard apparatus of claim 1, the roller configured as a lower working roller.

4. The skin guard apparatus of claim 1, the roller configured as a backup roller.

5. The skin guard apparatus of claim 1, the mill stand having a four-high configuration.

6. A skin guard apparatus, comprising:
   a) a protective cover having a flexible first layer and a flexible second layer, wherein said first layer and said second layer are secured to each other; and
   b) a roller having a smooth metal surface without mill marks, wherein said roller is a working roller operably connected to a mill stand;
   c) wherein said first layer comprises an impact-absorbing material operable to absorb an impact to prevent formation of a mill mark on said surface of said roller;
   d) wherein said second layer comprises a flexible magnetic material operable to reversibly secure said second layer to said surface of said roller.

7. The skin guard apparatus according to claim 6, wherein said cover is rectangular in shape.

8. The skin guard apparatus according to claim 7, further comprising a handle secured along each edge of said cover for manipulating said cover.

9. A skin guard apparatus, comprising:
   a) a rectangular protective cover having a flexible first layer, a flexible second layer, and a handle secured along each edge of said cover for manipulating said cover, wherein said first layer and said second layer are secured to each other; and
   b) a roller having a smooth metal surface without mill marks, wherein said roller is a working roller operably connected to a mill stand;
   c) wherein said first layer comprises an impact-absorbing material operable to absorb an impact to prevent formation of a mill mark on said surface of said roller;
   d) wherein said second layer comprises a flexible magnetic material operable to reversibly secure said second layer to said surface of said roller.

\* \* \* \* \*